United States Patent [19]

Morikita

[11] Patent Number: 5,405,259

[45] Date of Patent: Apr. 11, 1995

[54] INJECTION MOLDING MACHINE USING A PULSATING PRESSING FORCE

[75] Inventor: Nobuo Morikita, Yotsukaido, Japan

[73] Assignee: Sumitomo Heavy Industries, Ltd., Tokyo, Japan

[21] Appl. No.: 67,100

[22] Filed: May 26, 1993

Related U.S. Application Data

[63] Continuation-in-part of Ser. No. 899,188, Jun. 16, 1992, abandoned.

[30] Foreign Application Priority Data

Jun. 18, 1991 [JP] Japan ................................. 3-146165
Jun. 2, 1992 [JP] Japan ................................. 4-141376

[51] Int. Cl.$^6$ ............................................. B29C 45/40
[52] U.S. Cl. ..................................... 425/556; 264/334
[58] Field of Search ..................... 425/556, 554, 80; 264/334

[56] References Cited

FOREIGN PATENT DOCUMENTS

| | | |
|---|---|---|
| 48-26844 | 4/1973 | Japan . |
| 48-26845 | 4/1973 | Japan . |
| 58-12741 | 1/1983 | Japan . |
| 61-83016 | 4/1986 | Japan . |
| 63-22620 | 1/1988 | Japan . |
| 63-212057 | 9/1988 | Japan . |
| 2-26723 | 1/1990 | Japan . |
| 2-89615 | 3/1990 | Japan . |

Primary Examiner—Tim Heitbrink
Attorney, Agent, or Firm—Nikaido, Marmelstein, Murray & Oram

[57] ABSTRACT

A locally pressing type injection molding machine which performs various working operations on a molded product during an injection molding cycle is designed so that it can perform various working operation on a molded product after the injection step. To achieve this, a pressing pin is provided to extend in such a manner that it passes through at least part of either the fixed mold or the movable mold. A distal end of the pressing pin is provided in such a manner that it can advance into or retract from a cavity. A pressing cylinder is disposed behind the pressing pin to vibrate the pressing pin when a hydraulic pressure supply means supplies a pulsating hydraulic pressure to the pressing cylinder. A pulsating pressing force is applied to a resin which fills the cavity to work the molded product in a desired form. Therefore, a highly accurate worked surface can be obtained.

1 Claim, 9 Drawing Sheets

INJECTION MOLDING MACHINE USING A PULSATING PRESSING FORCE

This is a continuation in part of patent application Ser. No. 07/899188 filed on Jun. 16, 1992.

BACKGROUND OF THE INVENTION

1. Field of the Invention

The present invention relates to an injection molding machine of locally pressing type.

2. Description of the Prior Art

Heretofore, there have been proposed injection molding methods that resin in molds is locally pressed to apply a variety of processing operations on molded products with a view to eliminate the need of punching molded sheets or finishing the cut surfaces.

FIG. 1 shows successive steps of one conventional injection molding method of locally pressing type. In the drawing, (a) shows a state under molding, (b) a state under vibration applied for punching, and (c) a state after punching with vibration, respectively.

In FIG. 1, denoted by reference numeral 1 is a fixed mold attached to a fixed platen (not shown), 2 is a movable mold attached to a movable platen (not shown), 3 is a cavity defined between the fixed mold 1 and the movable mold 2, 4 is a sprue through which resin is delivered after being pushed out of an injection nozzle (not shown), 5 is a gate formed between the sprue 4 and the cavity 3, 6 is a fixed-side punch provided on the side of the fixed mold 1, and 7 is a movable-side punch provided on the side of the movable mold 2.

Both the fixed-side punch 6 and the movable-side punch 7 are vibrated by a vibrating device (not shown) disposed in the movable mold 2 during a cooling step after a dwell pressure application step in the course of an injection molding cycle. Since the fixed-side punch 6 and the movable-side punch 7 are arranged beforehand at a position to be punched or a part of the gate 5 where the molded product is to be processed, the vibration of the movable-side punch 7 produces heat due to shear stress in the portion to be processed (i.e., the portion to be punched or the gate portion 5) sandwiched between the movable-side punch 7 and the fixed-side punch 6, so that the resin is softened with the heat, as shown in (a).

By pushing the movable-side punch 7 in one direction as shown in (b), for example, while applying vibration under the above condition, the softened resin is cut out as shown in (c). In this case, the portion cut by movement of the movable-side punch 7 is finished with vibration and cooled to provide the processed surface having a luster and high accuracy.

However, the above-stated conventional injection molding method of locally pressing type is problematic in the complicated mold structure and the increased cost because the vibrating device is disposed in the movable mold 2 and operated to vibrate both the fixed-side punch 6 and the movable-side punch 7.

A further problem is raised in that the resin is cut out by vibrating the fixed-side punch 6 and the movable-side punch 7 during the cooling step after the dwell pressure application step so that the injection molding cycle is elongated.

SUMMARY OF THE INVENTION

It is an object of the present invention to solve the problems encountered in the conventional locally pressing type injection molding machine and to provide a locally pressing type injection molding machine which can perform a variety of working operations on a molded part in a dwell pressure application step and can therefore eliminate the need for machining after molding, and which enables a period of an injection molding cycle to be shortened to achieve a reduction in the production cost.

To achieve the above object, a locally pressing type injection molding machine according to the present invention includes a fixed mold, and a movable mold disposed in such a manner that it can make contact with or be separated from the fixed mold for forming at least one cavity between the fixed mold and the movable mold. A molded product is produced by filling the cavity with a resin. At least one pressing pin extends in such a manner that it passes through at least part of either the fixed mold or the movable mold. A distal end of the pressing pin is disposed in such a manner that it can advance into or retract from the cavity or a gate portion correspondive to a portion of a molded product to be worked. A pressing cylinder is disposed behind the pressing pin for advancing the pressing pin when a hydraulic pressure supply means supplies a pulsating hydraulic pressure to the pressing cylinder. A return spring is provided to urge the pressing pin in a direction in which the pressing pin retracts.

In the present invention, a desired working operation can be conducted on a molded product by vibrating a pressing pin and thereby applying a pulsating pressing force to a resin. Vibrations of the pressing pin are achieved by supplying a pulsating hydraulic pressure to the pressing cylinder in a dwell pressure application step or a cooling step after an injection step has been completed. Furthermore, since the amplitude of vibrations of the pressing pin can be varied by controlling the hydraulic pressure supply means, workability is improved. In addition, there is no need for providing a pressing device in the mold, and the structure of the apparatus can thus be simplified.

Since the pressure in the cavity can be maintained unchanged by performing gate cutting after the cavity has been filled with the resin, a dwell pressure application step is eliminated, and a metering step can thus be initiated immediately after gate cutting.

Furthermore, the cavity has a dummy portion which can be separated from part of a molded part by the advancing of the pressing pin. Therefore, the pressing pin can push the resin in the dummy portion to a mechanically limited position, and this enables the resin in the portion to be worked to be sufficiently vibrated.

Thus, a highly accurate worked surface can be obtained.

Also, since the molten resin which fills the cavity is vibrated, the period of the injection molding cycle can be shortened.

DETAILED DESCRIPTION OF PREFERRED EMBODIMENT

Hereinafter, one preferred embodiment of the present invention will be described in detail with reference to the drawings.

Figure 1A:
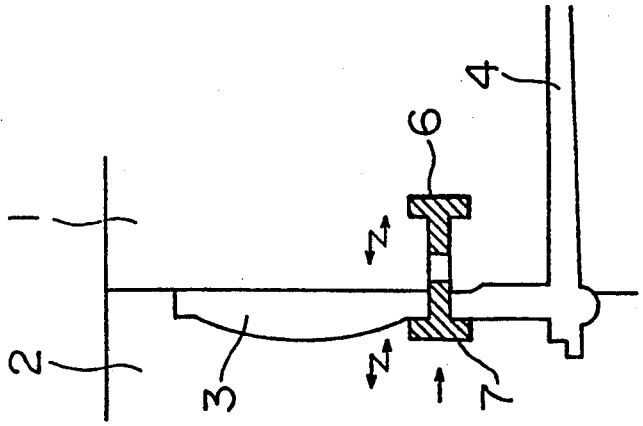
FIG. 1 shows successing steps of an injection molding method of locally pressing type in the prior art.
Figure 1B:
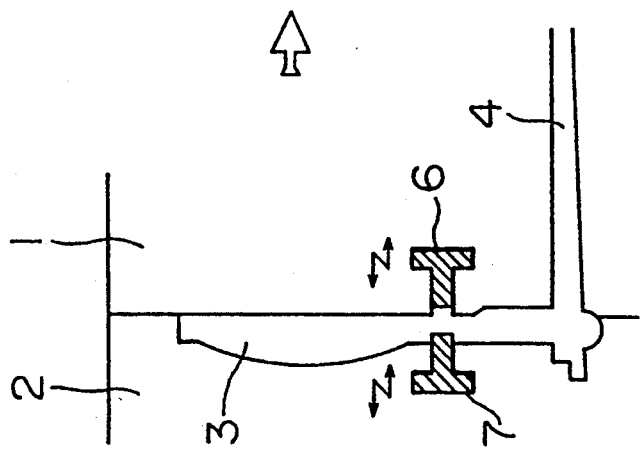
Figure 1C:
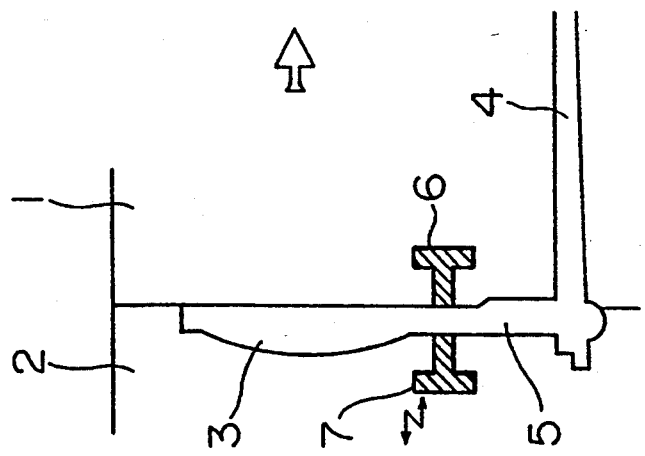
Figure 2:
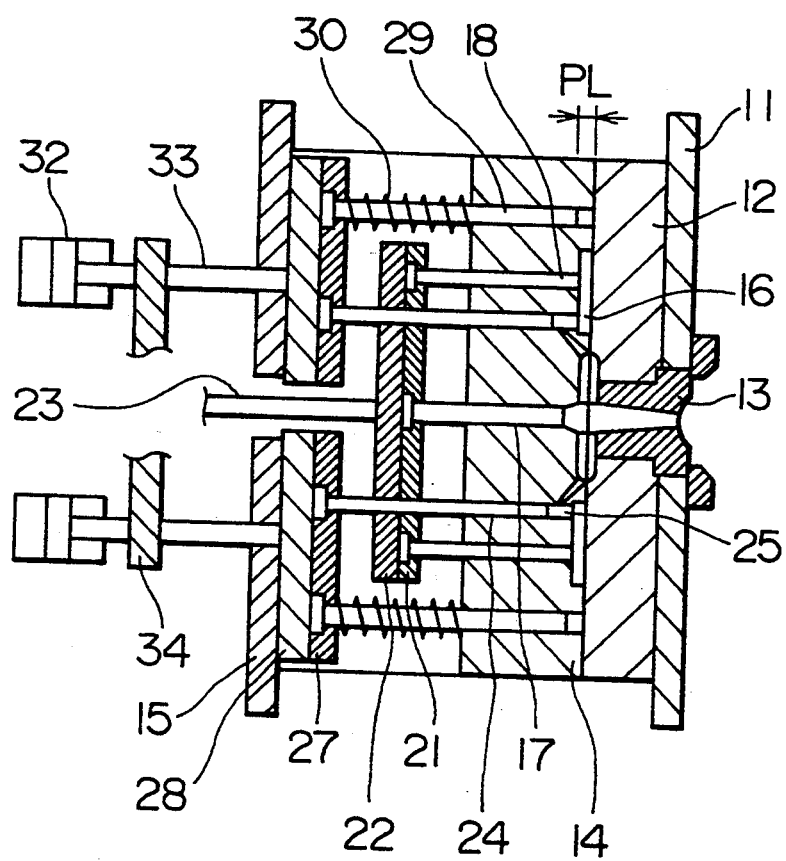
FIG. 2 is a cross-sectional view of a first embodiment of a locally pressing type injection molding machine according to the present invention.

FIG. 2 is a sectional view of a first embodiment of an injection molding machine of locally pressing type according to the present invention.

In FIG. 2, denoted by reference numeral 11 is a fixed-side attachment plate through which a fixed mold 12 is mounted on a fixed platen (not shown). An injection nozzle of an injection apparatus (not shown) is advanced in an injection step so that a distal end of the nozzle comes into contact with a sprue bushing 13 of the fixed mold 12.

On the other hand, a movable platen (not shown) is moved by a mold clamping device (not shown) to the left and right on the drawing, causing the movable mold 14 to come into or out of contact with the fixed mold 12. For that purpose, the movable mold 14 is fixed to the movable platen through a movable-side attachment plate 15 and a spacer block (not shown).

Resin injected through the nozzle passes through a sprue, runners and then gates 25 to fill cavities 16 defined between the fixed mold 12 and the movable mold 14.

Upon completion of the above injection step, the molding machine enters a dwell pressure application step in which the pressure of resin in the cavities 16 is increased and cooling of the resin is begun. After elapse of a certain period of time, both the molds 12, 14 are opened with molded products left on the side of the movable mold 14, and molded products are pushed out by an ejector device.

To this end, there are provided a sprue lock pin 17 and ejector pins 18. More specifically, the sprue lock pin 17 is disposed in opposite relation to the sprue and serves to hold the molded products when both the molds are opened, thereby leaving it on the side of the movable mold 14. The ejector pins 18 are disposed to face the cavities 16 or runners and serve to separate and drop the molded products from the movable mold 14 after the opening of the molds.

The sprue lock pin 17 and the ejector pins 18 extend rearwardly (toward the mold clamping device) through the movable mold 14 and are fixed in such a manner that head portions formed at their ends are held between a pair of vertical ejector plates 21 and 22. A rod 23 is arranged to abut upon ejector plates 21 and 22. As the rod 23 moves to the right on the drawing, the sprue lock pin 17 and the ejector pins 18 are moved to the right.

Furthermore, pressing pins 24 are provided to process portions of molded products to be processed during the above dwell pressure application step. The pressing pins 24 are disposed in number as many as necessary at predetermined positions facing the cavities 16, gates 25 and so on such that they extend rearwardly (toward the side of the mold clamping device) through the movable mold 14 and the ejector plates 21, 22 and head portions formed at their rear ends are held between a pair of vertical pressing plates 27, 28.

The vertical pressing plates 27, 28 are adjacent to the movable-side attachment plate 15 and disposed in such a manner that they are able to come into and out of contact with the movable-side attachment plate 15 by being moved back and forth by two pressing cylinders 32. These pressing cylinders 32 have pressing rods 33 which penetrate through a cross head 34 and the movable-side attachment plate 15 and abut upon the pressing plate 28. Thus, by actuating the pressing cylinders 32, the pressing pins 24 can be directly pushed out to the right.

A hydraulic fluid supplied under pressure to the pressing cylinders 32 is controlled by a proportional reducing valve or a servo valve (either not shown). By electrically controlling the proportional reducing valve or the servo valve, the pressing pins 24 are gradually advanced while being vibrated, so that a pulse-like force can be applied to the local portion of the molded products to be processed for the desired machining-like operation.

In the injection molding machine of locally pressing type constructed as mentioned above, however, since the pressing pins 24 are given the pressing force only in the direction of advancement by using the proportional reducing valve or the servo valve, the resin cannot be locally excited to oscillate (or displace).

A reaction force is needed to make the resin locally oscillate under excitation by actuating the pressing pins 24 in a vibratory manner. For that purpose, the pressing pins 24 are forcibly moved back away from the local portions to be processed. More specifically, there are provided four return pins 29 and associated return springs 30 with a high degree of response, the return springs 30 being disposed between the pressing plate 27 and the movable mold 14. The pressing pins 24 and the return pins 29 all have head portions formed at their ends, and are fixed in place with the head portions held between the vertical pressing plates 27 and 28. By arranging the four return springs 30 in an evenly distributed pattern, the pressing plates 27, 28 can be advanced in parallel without being inclined, to thereby ensure smooth movement of the pins.

Even in the case of employing the proportional reducing valve, the provision of the return springs 30 enables the pressing pins 24 to vibrate at frequency up to near 10 H2 by appropriately selecting the spring constant. In other words, taking into account that the proportional reducing valve produces a pulse-like force, those return springs 30 are selected which have the spring constant enough to make the return springs follow the pulse-like force. The spring constant is proportional to the weight of a drive section (e.g., comprised of the pressing plates 27, 28, the pressing rods 33, the cross head 34, etc.) and the vibration frequency of a pulse-like input. Thus, when it is desired to raise the vibration frequency or increase the weight of the drive section, the spring constant must be enlarged.

Assuming now that the weight of the drive section is about 18.5 kg and the vibration frequency is 10 Hz, by way of example, the total spring constant is 80 Kgf/mm. In the case of installing the four return springs 30, the spring constant per return spring is 200 Kgf/cm. Then, preload of the return spring 20 is set to about 10% of the maximum pressing force (880 Kgf), for example, 80 Kgf. The preload is provided to improve control efficiency of the proportional reducing valve.

Characteristics of the return springs 30 in the above construction will be described below.

Figure 3:
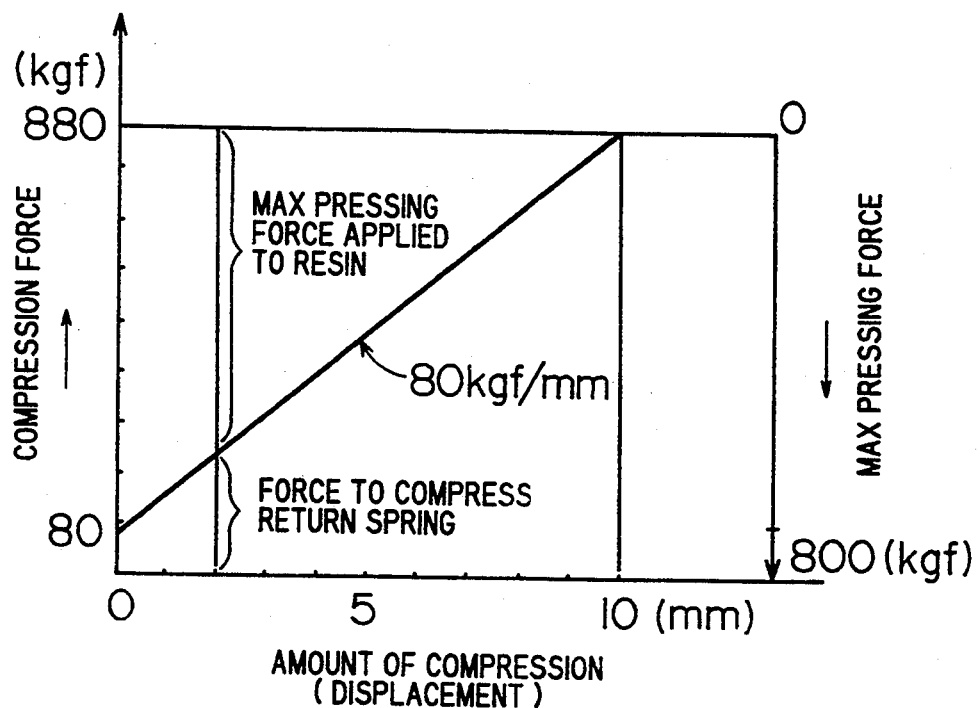
FIG. 3 is a graph showing the characteristics of a return spring mounted on the first embodiment of the locally pressing type injection molding machine according to the present invention.

FIG. 3 is a characteristic graph of the return spring installed in the first embodiment of the injection molding machine of locally pressing type according to the present invention.

In the injection molding machine of locally pressing type according to the present invention, the maximum pressing force (hydraulic pressure of 150 Kgf/cm$^2$) of the pressing pin 24 (FIG. 2) is 880 Kgf. Accordingly, the maximum amount of compression (displacement) of each return spring 30 is given by:

$(880-80)/80=10$ cm

The maximum pressing force effectively applied to the resin decreases with the amount of compression increasing, and becomes 0 when the amount of compression is 10 mm.

Figure 4:
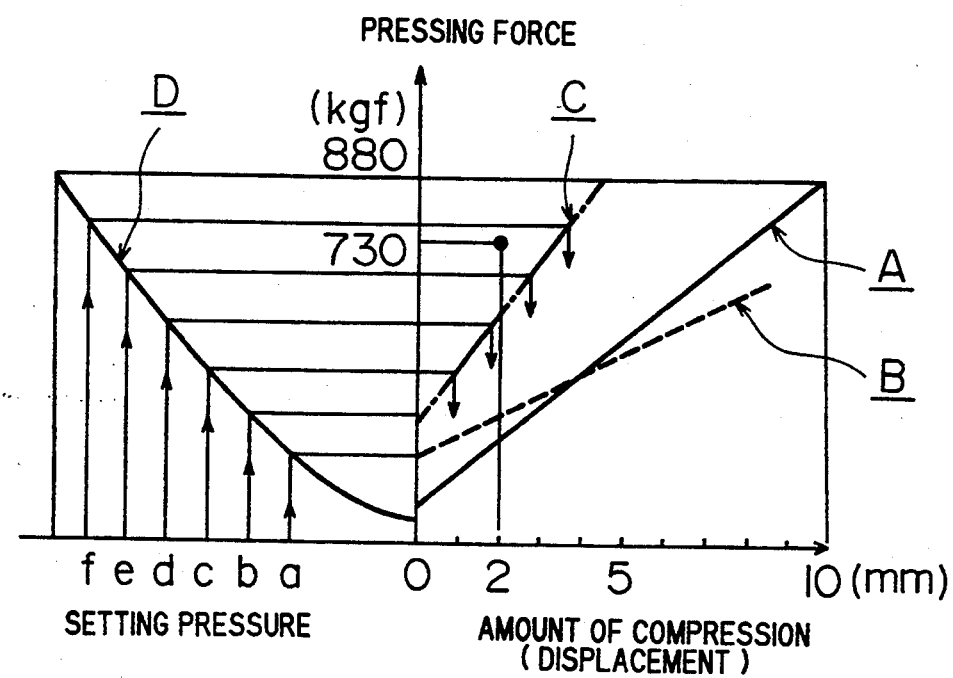
FIG. 4 is a graphic representation of the relation between the pressing force applied to the resin in a cavity, the amount of compression and the setting pressure of a proportional reducing valve.

FIG. 4 is a graph showing relationships of the pressing force and the amount of compression of resin in the cavity versus setting pressure of the proportional reducing valve.

As shown in the right half of FIG. 4, an overall load characteristic in combination of the return springs 30 (FIG. 2) and the resin after completion of the injection step is given by C as the sum (A+B) of a spring characteristic A and a pressing force/displacement characteristic B. The spring characteristic A represents a relationship between the force applied to the pressing plates 27, 28 and the amount of compression of the return spring 30, whereas the pressing force/displacement characteristic B represents a relationship between the pressing force applied to the resin and the displacement.

Also, as shown in the left half of FIG. 4, a relationship between setting pressure of the proportional reducing valve (not shown) and the actual pressing force is represented by a pressing force characteristic D. When the pulse-like pressing force is set by setting pressures of a to f, a local portion of the resin to be processed is excitedly oscillated with the respective displacements as given by the overall load characteristic C. In the cases of the setting pressures of a and b, because the pressing force is smaller than the sum of the preload of the return springs 30 and the force required to produce an initial displacement of the resin, these cases are not on the curve of the overall load characteristic C and thus the resin displacement is 0.

Figure 5:
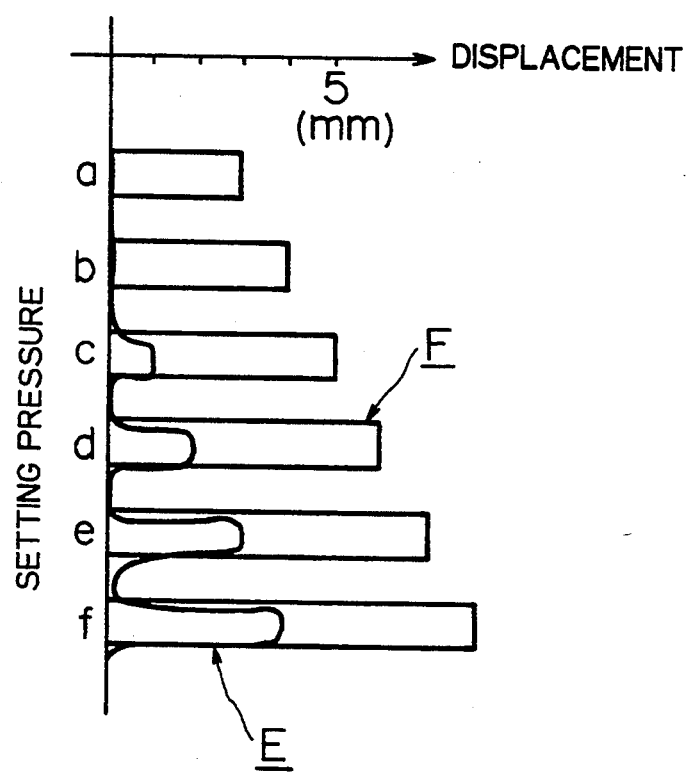
FIG. 5 illustrates the relation between the setting pressure and the displacement.

FIG. 5 is a graph showing a relationship between the setting pressure and the displacement.

When the setting pressure of the proportional reducing valve is gradually increased step by step as shown as a to f, the pulse-like pressing force as shown at F is applied to the resin and the resin is caused to displace as shown at E. The program for setting the above pulse-like pressing force may be optionally set until opening the molds through dwell pressure application step and the cooling step after start of the injection step. The proportional reducing valve has such a tendency that the linear characteristic is slightly failed in a low pressure setting area.

With the injection molding machine of locally pressing type as described, a resin molded product can be locally processed in various manners by applying forces to local portions of the resin through the pressing pins 24 (FIG. 2) during the injection step or the dwell pressure application step.

Figure 6A:
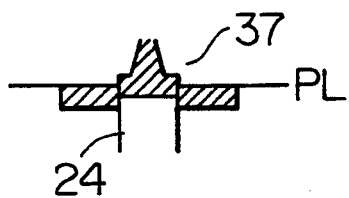
FIGS. 6A and 6B illustrate a gate cut/post processed state in the first embodiment of the locally pressing type injection molding machine according to the present invention.
Figure 6B:
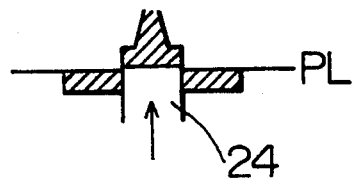
Figure 7A:
FIGS. 7A and 7B illustrate a pin-hole drilled state in the first embodiment of the locally pressing type injection molding machine according to the present invention.
Figure 7B:
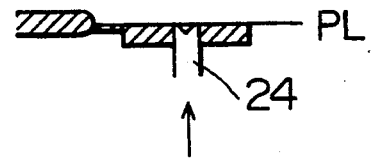

FIGS. 6A and 6B show steps of gate cutting and post-processing by the first embodiment of the injection molding machine of locally pressing type according to the present invention, and FIGS. 7A and 7B show successive steps of punching a pin hole by the first embodiment of the injection molding machine of locally pressing type according to the present invention. In each of FIGS. 6A and 7A represents a state before the processing and each of FIGS. 6B and 7B represents a state after the processing. In these figures, PL shows a parting line.

In FIGS. 6A and 6B, a disk gate 37 is separated by the pressing pin 24.

Further, in FIGS. 7A and 7B, the pressing pin 24 is actuated immediately after conversion from speed control in the injection step into pressure control in the dwell pressure application step, thereby forming a pin hole in the molded product. In this case, the final punching is performed as post-processing.

A second embodiment of the present invention will be described below.

Figure 8:
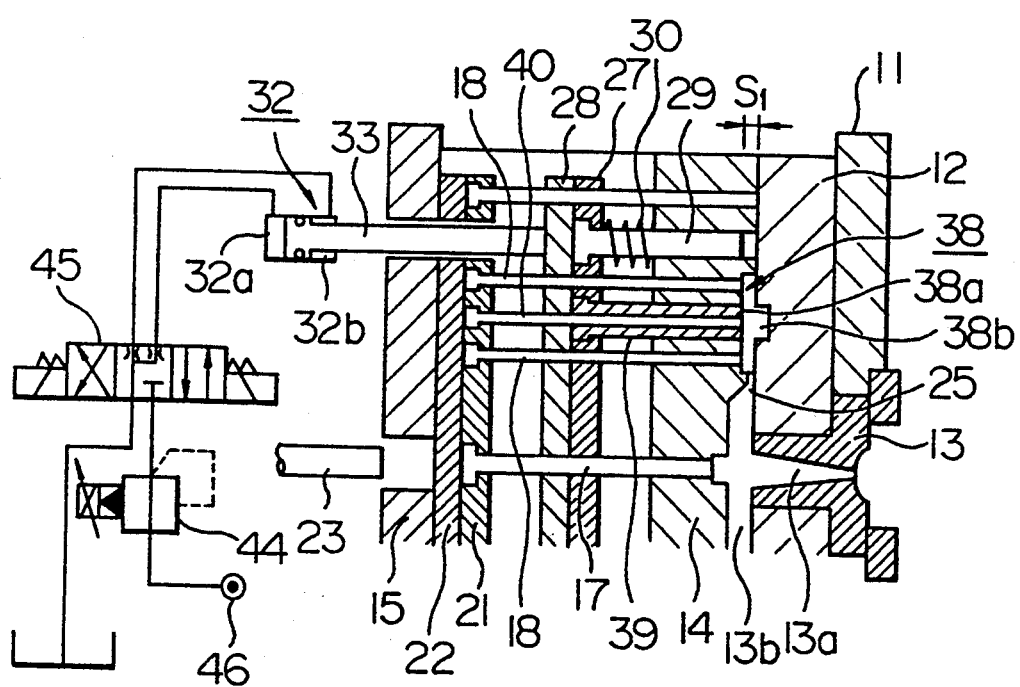
FIG. 8 is a cross-sectional view of a second embodiment of the locally pressing type injection molding machine according to the present invention.

FIG. 8 is a sectional view of a second embodiment of a locally pressing type injection molding machine according to the present invention.

In FIG. 8, denoted by reference numeral 11 is a fixed-side attachment plate 11 through which a fixed mold 12 is attached to a fixed platen (not shown). An injection nozzle of an injection apparatus (not shown) advances in an injection step so that a distal end of the injection nozzle makes contact with a sprue bushing 13 of the fixed mold 12.

A movable platen (not shown) is advanced and retracted by a mold clamping device (not shown) (moved to the left and right as viewed in FIG. 8) so as to bring a movable mold 14 into contact with or to separate the movable mold 14 from the fixed mold 12. Hence, the movable mold 14 is mounted on the movable platen through a movable-side attachment plate 15 and a spacer block which is not shown.

A resin injected from the injection nozzle passes through a sprue 13a and then a runner 13b to fill a cavity 38 formed between the fixed mold 12 and the movable mold 14 through a gate 25.

After the injection step has been completed, the injection molding operation enters a dwell pressure application step in which the pressure of resin in the cavity 38 is increased while cooling of the resin begins. After a predetermined period of time has elapsed, both the molds 12 and 14 are opened with a molded product (not shown) left in the movable mold 14, and the molded product is ejected by an ejector device.

Hence, a sprue lock pin 17 and ejector pins 18 are provided. More specifically, the sprue lock pin 17 is provided in opposed relation to the sprue 13a in order to hold the molded product in the movable mold 14 when both the molds are opened. Each of the ejector pins 18 is disposed with a distal end thereof facing the cavity 38 or the runner 13b in order to eject the molded product from the movable mold 14 after the molds are opened.

The sprue lock pin 17 and the ejector pins 18 have at a rear end thereof a head portion which is sandwiched and fixed between ejector plates 21 and 22. A rod 23 is provided in such a manner that it can make contact with the ejector plates 21 and 22. Thus, as the rod 23 advances, the sprue lock pin 17 and the ejector pins 18 advance.

A pressing pin 39 is provided in order to perform working on a molded product during the dwell pressure application step, and an ejector pin 40 is provided in such a manner that it passes through the pressing pin 39. Both a distal end of the pressing pin 39 and a distal end of the ejector pin 40 are disposed in such a manner that they face a portion of the molded product to be worked, e.g., a drilled portion 38a thereof. A head portion formed at the rear end of the pressing pin 39 is fixedly gripped between pressing plates 27 and 28, while a head portion formed at the rear end of the ejector pin 40 is fixedly gripped between the ejector plates 21 and 22.

A support member (not shown) restricts the movement range of the pressing plates 27 and 28 so that they do not move further rearward (toward the mold clamping device) from a position shown in FIG. 8.

A dummy portion 38b is provided in the cavity 38 at a position corresponding to the drilled portion 38a of the molded product. The dummy portion 38b is formed in the fixed mold 12. The dummy portion 38b having a shape corresponding to that of the pressing pin 39 is a recessed portion having a diameter larger than that of the pressing pin 39 by about 0.01 to 0.1 mm. Thus, when the pressing pin 39 is advanced and the distal end thereof enters the dummy portion 39b, the dummy portion 39b can be separated from the part of the molded product through the pressing pin 39.

The ejector pin 40 is advanced when the molds are opened to eject the resin solidified in the dummy portion 38b.

The pressing plates 27 and 28 are advanced and retracted by two pressing cylinders 32 (one of which is shown in FIG. 8). A pressing rod 33 of each of the pressing cylinders 32 passes through the movable-side attachment plate 15 and then the ejector plates 21 and 22, and is coupled to the pressing plate 28. Activation of the pressing cylinders 32 advances the pressing pin 39 by an advancing stroke $S_1$.

To achieve this advancing operation of the pressing pin 39, a proportional reducing valve 44 and a directional control valve 45 which electrically control a hydraulic pressure supplied from a pump 46 are provided. A controlled pulsating hydraulic pressure is supplied to an hydraulic fluid chamber 32a of each of the pressing cylinders 32. The supplied pulsating hydraulic pressure gradually moves the pressing pin 39 forward while vibrating it to vibrate the resin at the portion of the molded product to be worked and thereby perform a desired working operation on the molded product. The hydraulic fluid chamber 32b of the pressing cylinder 32 is provided in order to retract the pressing rod 33 to its original position.

Since the dummy portion 38b having a shape corresponding to the pressing pin 39 is formed in the drilled portion 38a of the cavity 38, the pressing pin 39 can push the resin to a mechanically limited position in the dummy portion 38b. At that time, a hole having the same shape as the contour of the pressing pin 39 is formed in the molded product. Furthermore, since the pressing pin 39 pushes the resin in the dummy portion 38b to the mechanically limited position, the resin which forms the portion of the molded product to be worked can sufficiently be vibrated, thus allowing a highly accurate worked surface to be obtained.

The above-described hydraulic system is constructed such that the proportional reducing valve 44 and the directional control valve 45 supply an hydraulic pressure only in a forward direction of the pressing pin 39. In order to vibrate the resin, the pressing pin 39 must therefore be retracted. Hence, four return pins 29 each with a return spring 30 having a high responsibility provided thereon (FIG. 8 shows only one of these four return pins) are disposed between the pressing plate 27 and the movable mold 14.

In brief, the pressing cylinder 32 generates a pressing force only in the forward direction thereof, and the return spring 30 generates a reaction force only in a rearward direction of the pressing cylinder to press the pressing plates 27 and 28. When these two forces balance, vibrations having a few hertz to 10 hertz can be generated in the pressing pin 39.

Figure 9:
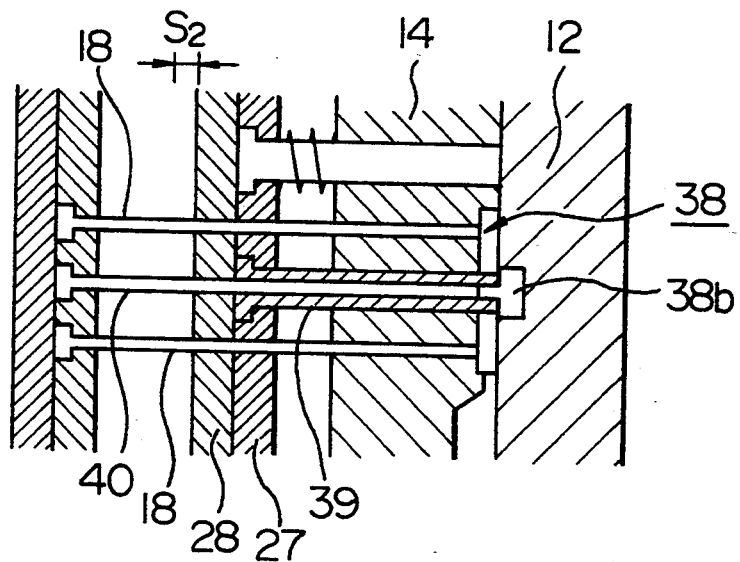
FIG. 9 illustrates a state in which a filling/pressing step has been completed in the second embodiment of the locally pressing type injection molding machine according to the present invention.
Figure 10:
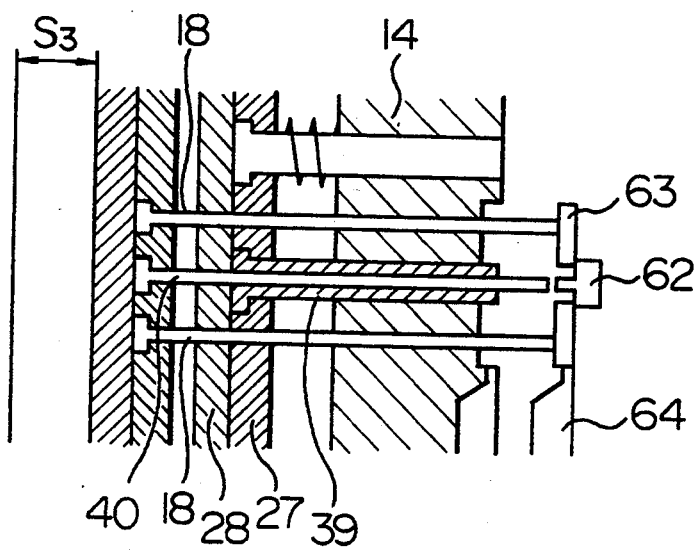
FIG. 10 illustrates a state in which a mold opening/product ejecting step has been completed in the second embodiment of the locally pressing type injection molding machine according to the present invention.

FIG. 9 shows a state in which the resin filling/pressing step has been completed in the second embodiment of the locally pressing type injection molding machine according to the present invention. FIG. 10 shows a state in which the mold opening and ejection of the molded product have been completed in the second embodiment of the locally pressing type injection molding machine according to the present invention, FIG. 11 shows a pressing program of the pressing pin.

In FIGS. 9 and 10, reference numeral 12 denotes a fixed mold; 14, a movable mold; 27 and 28, pressing plates; 38, a cavity; 18 and 40, ejector pins; 39, a pressing pin; 62, a resin piece; 63, a molded product; 64, a product runner; $S_2$, a pressing stroke; and $S_3$, an ejector stroke.

Figure 11:
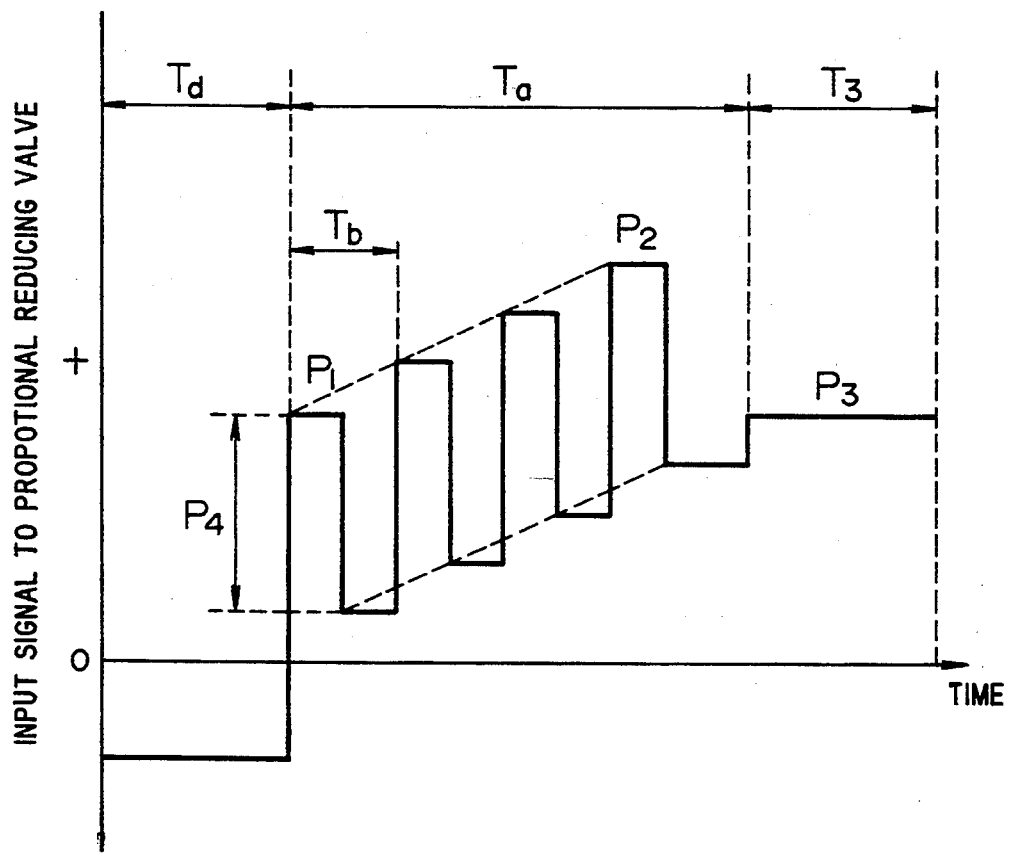
FIG. 11 shows a pressing program for a pressing pin.

In FIG. 11, the abscissa axis represents the time, and the ordinate axis represents an input signal to the proportional reducing valve 44 (FIG. 8). $T_d$ represents the pressing delay time. $T_a$ represents the pressing time. $T_b$ represents the pressing cycle time. $T_3$ represents the final pressing time. $P_1$ represents the initial pressing force. $P_2$ represents the last pressing force. $P_3$ represents the final pressing force. $P_4$ represents the reduced pressing force.

Filling of the resin into the cavity 38 is initiated when the pressing pin 39 is located at a position shown in FIG. 8. Pressing can be initiated at any time between when the resin is melted and when the resin has a thermally deformable temperature or above. For example, pressing may be initiated when a pressing delay time $T_d$ has elapsed after the injection starting point of V-P switched point (a time it takes for the resin to fill the cavity 38 after filling is initiated).

Pressing continues for pressing time $T_a$ during which the set value of the pressing force is increased and reduced, as shown in FIG. 11. In that case, the pressing force is gradually increased from the initial pressing force $P_1$ is gradually increased from the initial pressing force $P_1$ to the last pressing force $P_2$ Finally, the final pressing force $P_3$ is retained for the final pressing time $T_3$ without the pressing pin 39 being vibrated.

At that time, the position of the pressing plates 27 and 28 and that of the pressing pin 39 are determined by the relation between the pressing force and the reaction force. An increase or decrease in the pressing force advances or retracts the pressing pin 39. The pressing pin 39 gradually advances while moves back and forth relative to the resin in the cavity 38 and thereby pushes the resin into the dummy portion 38b to the mechanically limited position thereof according to the pressing program shown in FIG. 11.

The instruction given to the proportional reducing valve 44 San desirably be set according to the pressing program shown in FIG. 11. The instructions required to set the pressing forces which start with the initial pressing force $P_1$ and end with the last pressing force $P_2$ are automatically calculated.

When pressing has been completed, the pressing pin 39 is located at a position shown in FIG. 9. At that time, working of the molded product 63 is completed.

Subsequently, the molds are opened. At that time, an undercut is provided on the resin piece 62 which has been solidified in the dummy portion 38b so that the resin piece can remain in the movable mold 14. The pressing pin 39 is located to the position shown in FIG. 10 and the ejector pins 18 advance to eject the molded product 63 and the product runner 64. At that time, the ejector pin 40 is also advanced to eject the resin piece 62.

A third embodiment of the present invention will be described below.

Figure 12:
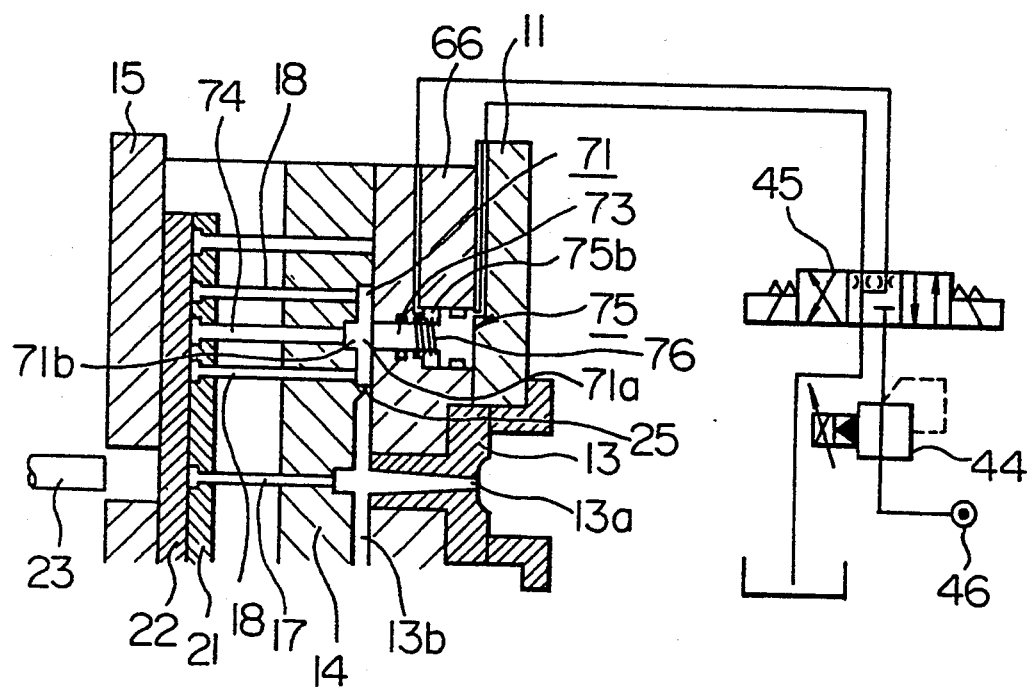
FIG. 12 is a cross-sectional view of a third embodiment of the locally pressing type injection molding machine according to the present invention.
Figure 13:
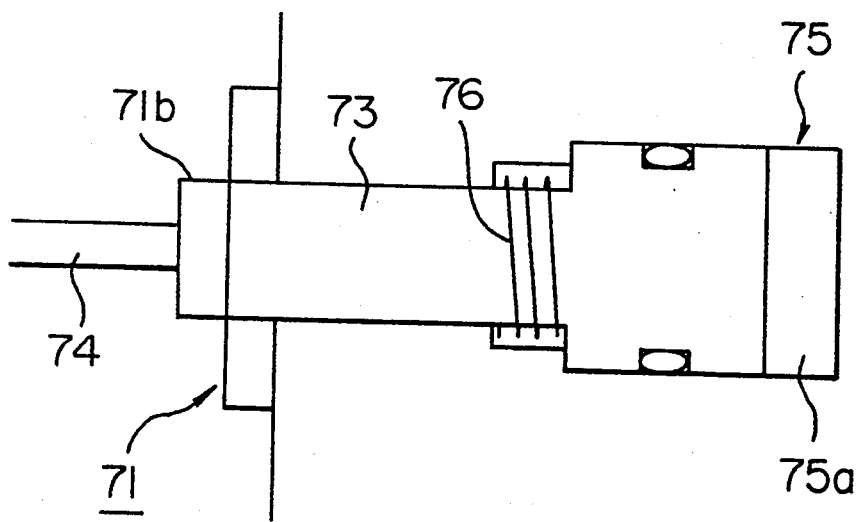
FIG. 13 illustrates a state in which a filling/pressing step has been completed in the third embodiment of the locally pressing type injection molding machine according to the present invention.

FIG. 12 is a cross-sectional view of a third embodiment of a locally pressing type injection molding machine according to the present invention. FIG. 13 shows a state in which the filling/pressing step has been completed in the third embodiment of the locally pressing type injection molding machine according to the present invention.

In FIGS. 12 and 13, reference numeral 11 denotes a fixed-side attachment plate through which a fixed mold 66 is mounted on a fixed platen (not shown). An injection nozzle of an injection molding apparatus (not shown) advances in an injection step so that a distal end of the injection nozzle makes contact with a sprue bushing 13 of a fixed mold 66.

A movable platen (not shown) is advanced and retracted by a mold clamping device (not shown) (moved to the left and right as viewed in FIG. 12) so as to bring a movable mold 14 into contact with or to separate the movable mold 14 from the fixed mold 66. Hence, the movable mold 14 is mounted on the movable platen through a movable-side attachment plate 15 and a spacer block which is not shown.

A resin injected from the injection nozzle passes through a sprue 13a and then a runner 13b fill a cavity 71 formed between the fixed mold 66 and the movable mold 14 through a gate 25.

After the injection step has been completed, the injection molding operation enters a dwell pressure application step in which the pressure of the resin in the cavity 71 is increased while cooling of the resin begins. After a predetermined period of time has elapsed, both the molds 14 and 66 are opened with a molded product 63 (FIG. 10) left in the movable mold 14, and then the molded product 63 is ejected by an ejector device.

Hence, a sprue lock pin 17 and ejector pins 18 are provided. More specifically, the sprue lock pin 17 is provided in opposed relation to the sprue 13a in order to hold the molded product in the movable mold 14 when both the molds are opened. Each of the ejector pins 18 is disposed with a distal end thereof facing the cavity 71 or the runner 13b in order to eject the molded product from the movable mold 14 after the molds are opened.

The sprue lock pin 17 and the ejector pins 18 have at a rear end thereof a head portion which is sandwiched and fixed between ejector plates 21 and 22. A rod 23 is provided in such a manner that it can make contact with the ejector plates 21 and 22. Thus, as the rod 23 advances, the sprue lock pin 17 and the ejector pins 18 advance.

A pressing pin 73 is provided in the fixed mold 66 in order to perform working on a molded product during the dwell pressure application step. The pressing pin 73 is disposed with a distal end thereof facing the portion of the molded product to be worked, e.g., a drilled portion 71a.

A dummy portion 71b is provided in the cavity 71 at a position corresponding to the drilled portion 71a of the molded product. The dummy portion 71b is formed in the movable mold 14. The dummy portion 71b having a shape corresponding to that of the pressing pin 73 is a recessed portion having a diameter larger than that of the pressing pin 73 by about 0.01 to 0.1 mm.

An ejector pin 74 is disposed with a distal end thereof facing the dummy portion 71b. The ejector pin 74 passes through the movable mold 14 and then extends in a rearward direction (toward the mold clamping device). A head formed at the rear end of the ejector pin 74 is fixedly gripped between the ejector plates 21 and 22. The ejector pin 74 is advanced when the molds are opened to eject the resin piece 62 which has been solidified in the dummy portion 71b.

The pressing pin 73 is advanced and retracted by two pressing cylinders 75 (one of which is shown in FIG. 12) provided in the fixed mold 66. The pressing pin 73 constitutes a pressing rod of the pressing cylinder 75. Activation of the pressing cylinders 75 advances the pressing pin 73.

To achieve this advancing operation of the pressing pin 73, a proportional reducing valve 44 and a directional control valve 45 which electrically control a hydraulic pressure supplied from a pump 46 are provided. A controlled pulsating hydraulic pressure is supplied to an hydraulic fluid chamber 75a of each of the pressing cylinders 75. The supplied pulsating hydraulic pressure gradually moves the pressing pin 73 forward while vibrating it to vibrate the resin at the portion of the molded product 63 to be worked and thereby perform a desired working operation on the molded product 63. The hydraulic fluid chamber 75b of the pressing cylinder 75 is provided in order to retract the pressing rod 73 to its original position. In addition, a supporting member (not shown) restricts the movement range of the pressing pin 73 so that it does not advance beyond the thickness of the cavity 72.

Since the dummy portion 71b having a shape corresponding to the pressing pin 73 is formed in the drilled portion 71a of the cavity 71, the pressing pin 73 can push the resin to a mechanically limited position in the dummy portion 71b. At that time, a hole having the same shape as the contour of the pressing pin 73 is formed in the molded product 63. Furthermore, since the pressing pin 73 pushes the resin in the dummy portion 71b to the mechanically limited position, the resin which forms the portion of the molded product to be worked can sufficiently be vibrated, thus allowing a highly accurate worked surface to be obtained.

The above-described hydraulic system is constructed such that the proportional reducing valve 44 and the directional control valve 45 supply an hydraulic pressure only in a forward direction of the pressing pin 73. In order to vibrate the resin, the pressing pin 73 must therefore be retracted. Hence, a return spring 76 having a high responsibility is provided on the pressing pin 73.

In this embodiment, the pressing pin 73 is advanced and retracted by the two pressing cylinders 75 (one of which is shown in FIG. 12) formed in the fixed mold 66. However, it may also be arranged such that the pressing cylinder 74 is disposed outside the fixed mold 66 while the pressing rod passes through the fixed mold 66.

It is to be noted that the invention is not limited by any of the details of description but various changes and modifications are possible without departing from the spirit and scope thereof.

What is claimed is:

1. An injection molding machine, comprising:
    a fixed mold;
    a movable mold disposed in such a manner that said movable mold can make contact with or be separated from said fixed mold, said movable mold and said fixed mold forming at least one cavity therebetween;
    at least one pressing pin extending in such a manner that said pressing pin passes through said movable mold, a distal end of said pressing pin being disposed in such a manner that said distal end can advance into or retract from one of said cavity and a gate portion corresponsive to a portion of a molded product to be worked;
    a pressing plate fixed to a rear end of said pressing pin;
    a pressing cylinder disposed behind said pressing plate for advancing said pressing pin when a hydraulic pressure is supplied;
    a hydraulic pressure supply means for supplying a pulsating hydraulic pressure to said pressing cylinder; and
    a return spring disposed between said pressing plate and said movable mold for urging said pressing pin in a direction in which said pressing pin retracts, to thereby ensure smooth movement of the pressing pin.

* * * * *